(12) United States Patent
Wang et al.

(10) Patent No.: US 12,438,850 B2
(45) Date of Patent: *Oct. 7, 2025

(54) PRIVACY-PRESERVING TECHNIQUES FOR CONTENT SELECTION AND DISTRIBUTION

(71) Applicant: Google LLC, Mountain View, CA (US)

(72) Inventors: Gang Wang, Frederick, MD (US); Marcel M. Moti Yung, New York, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/744,187

(22) Filed: Jun. 14, 2024

(65) Prior Publication Data

US 2024/0414136 A1    Dec. 12, 2024

Related U.S. Application Data

(63) Continuation of application No. 17/794,146, filed as application No. PCT/US2021/062880 on Dec. 10, 2021, now Pat. No. 12,052,227.

(30) Foreign Application Priority Data

Dec. 13, 2020  (IL) .......................................... 279406

(51) Int. Cl.
   *H04L 29/06* (2006.01)
   *G06F 21/62* (2013.01)
   *H04L 9/40* (2022.01)

(52) U.S. Cl.
   CPC ...... *H04L 63/0421* (2013.01); *G06F 21/6254* (2013.01)

(58) Field of Classification Search
   CPC ............. H04L 63/0421; G06F 21/6254; G06F 21/6245; H04W 12/02
   See application file for complete search history.

(56) References Cited

U.S. PATENT DOCUMENTS 9,679,314 B1 *  6/2017  Wang ................... G06F 16/9535
10,078,656 B1 *  9/2018  Carl ..................... G06F 16/2365
(Continued)

FOREIGN PATENT DOCUMENTS

CN        111125736        5/2020
CN        112041811        12/2020
(Continued)

OTHER PUBLICATIONS

Shang et al., "A privacy-preserving approach to policy-based content dissemination", 2010 IEEE 26th International Conference on Data Engineering (ICDE 2010), Date of Conference: Mar. 1-6, 2010.*

(Continued)

*Primary Examiner* — Morshed Mehedi
(74) *Attorney, Agent, or Firm* — Fish & Richardson P.C.

(57) ABSTRACT

This document describes systems and techniques for improving the integrity and protecting the security of information in content selection and distribution. In one aspect, a method includes receiving, by a first server of a secure multi-party computation (MPC) system and from an application on a client device, a request for a selection value. In response to receiving the request, the first server conducts, in collaboration with a second server of the secure MPC system, a privacy-preserving selection process and a counterfactual selection process. The first server transmits a selection result defining the first winning selection value from the privacy-preserving selection process and the second winning selection value from the counterfactual selection process and receives, from the application on the client device, a notification indicating that a digital component corresponding to the winning selection value from the privacy-preserving selection process was presented at the client device.

20 Claims, 4 Drawing Sheets

(56) References Cited

U.S. PATENT DOCUMENTS

| | | | |
|---|---|---|---|
| 12,052,227 | B2* | 7/2024 | Wang .................. G06F 21/6245 |
| 2004/0225681 | A1* | 11/2004 | Chaney .................. H04W 4/90 |
| 2012/0011538 | A1 | 1/2012 | Yarvis et al. |
| 2018/0365043 | A1* | 12/2018 | Kaufman ............ G06F 11/3672 |
| 2020/0311300 | A1 | 10/2020 | Callcut et al. |

FOREIGN PATENT DOCUMENTS

| | | |
|---|---|---|
| JP | 2013-140510 | 7/2013 |
| JP | 2016-517069 | 6/2016 |
| JP | 2016-157454 | 9/2016 |
| JP | 2017-054539 | 3/2017 |
| KR | 10-2020-0019061 | 2/2020 |
| KR | 10-2020-0121106 | 10/2020 |
| WO | WO 2007101973 | 9/2007 |
| WO | WO 2018124729 | 7/2018 |
| WO | WO 2020144768 | 7/2020 |

OTHER PUBLICATIONS

Guerriero et al., "Defining, Enforcing and Checking Privacy Policies In Data-Intensive Applications", 2018 ACM/IEEE 13th International Symposium on Software Engineering for Adaptive and Self-Managing Systems, pp. 172-182, May 28, 2018.*

Notice of Allowance in Korean Appln. No. 10-2022-7021324, mailed on Dec. 5, 2024, 5 pages (with English translation).

Breaux et al., "Analyzing Regulatory Rules for Privacy and Security Requirements" IEEE Transactions On Software Engineering, vol. 34, No. 1, Jan./Feb., Jan./Feb. 2008, 5-20.

Extended European Search Report in European Appln. No. 22182700.9, mailed on Aug. 3, 2022, 8 pages.

Helsloot et al., "Badass: Preserving privacy in behavioural advertising with applied secret sharing." 12th International Conference on Provable Security, Aug. 14, 2018, 1-23.

IBM, "Method for selecting advertisements respecting user privacy" May 8, 2009, 7 pages.

International Preliminary Report on Patentability in International Appln. No. PCT/US2021/062880, mailed on Jun. 22, 2023, 9 pages.

International Search Report and Written Opinion in International Appln. No. PCT/US2021/062880, mailed on Mar. 25, 2022, 15 pages.

Notice of Allowance in Japanese Appln. No. 2022-540742, mailed on Feb. 19, 2024, 5 pages (with English translation).

Office Action in Israel Appln. No. 279406, mailed on May 4, 2023, 4 pages.

Office Action in Japanese Appln. No. 2022-540742, mailed on Oct. 23, 2023, 13 pages (with English translation).

Wikipedia.org [online], "Private information retrieval", Nov. 2004, retrieved on Oct. 3, 2022, retrieved from URL <https://en.wikipedia.org/wiki/Private_information_retrieval>, 4 pages.

Office Action in Indian Appln. No. 202227031951, mailed on Feb. 17, 2025, 6 pages (with English translation).

Office Action in Chinese Appln. No. 202180008029.2, mailed on Apr. 27, 2025, 10 pages (with English translation).

* cited by examiner

300

302
Receive, by a first server of a secure multi-party computation (MPC) system and from an application on a user device, a request for a selection value

304
In response to receiving the request and by the first server of the secure MPC system: conduct, in collaboration with a second server of the secure MPC system, a privacy-preserving selection process to select a first winning selection value from among a set of selection criteria by applying each rule of a set of selection rules, including a privacy-preserving anonymity enforcement rule

306
In response to receiving the request and by the first server of the secure MPC system: conduct, in collaboration with the second server of the secure MPC system, a counterfactual selection process to select a second winning selection value from among the set of selection values by applying each rule of the set of selection rules, except for the privacy-preserving anonymity enforcement rule

308
Transmit, by the first server of the secure MPC system, the winning selection value from the privacy-preserving selection process and the winning selection value from the counterfactual selection process

310
Receive, by the first server of the secure MPC system and from the application on the user device, a notification comprising data indicating that a digital component corresponding to the winning selection value from the privacy-preserving selection process was presented at the client device

312
Update, by the first server of the secure MPC system, a privacy-preserving data structure for determining whether digital components satisfy the privacy-preserving anonymity enforcement rule that maintains a value for a privacy-preserving characteristic corresponding to the winning selection value from the counterfactual selection process

FIG. 3

PRIVACY-PRESERVING TECHNIQUES FOR CONTENT SELECTION AND DISTRIBUTION

CROSS-REFERENCE TO RELATED APPLICATIONS

This application is a continuation application and claims priority under 35 U.S.C. § 120 to U.S. patent application Ser. No. 17/794,146, filed on Jul. 20, 2022, which is a National Stage Application under 35 U.S.C. § 371 and claims the benefit of International Application No. PCT/US2021/062880, filed Dec. 10, 2021, which claims the benefit of priority to Israeli Application Serial No. 279406, filed Dec. 13, 2020. The foregoing applications are incorporated herein by reference in their entirety.

TECHNICAL FIELD

This specification is related to data security, data integrity, and cryptography.

BACKGROUND

Secure multi-party computation (MPC) is a family of cryptographic protocols that prevent access to data by distributing a computation across multiple parties such that no individual party can access another party's data. The MPC computing systems perform the computations using secret shares of the data.

SUMMARY

In general, one innovative aspect of the subject matter described in this specification can be embodied in a method that includes receiving, by a first server of a secure multi-party computation (MPC) system and from an application on a client device, a request for a selection value, in response to receiving the request and by the first server of the secure MPC system: conducting, in collaboration with a second server of the secure MPC system, a privacy-preserving selection process to select a first winning selection value from among a set of selection values by applying each rule of a set of selection rules, including a privacy-preserving anonymity enforcement rule, and conducting, in collaboration with the second server of the secure MPC system, a counterfactual selection process to select a second winning selection value from among the set of selection values by applying each rule of the set of selection rules, except for the privacy-preserving anonymity enforcement rule, transmitting, by the first server of the secure MPC system, a selection result defining the first winning selection value from the privacy-preserving selection process and the second winning selection value from the counterfactual selection process, receiving, by the first server of the secure MPC system and from the application on the client device, a notification including data indicating that a digital component corresponding to the winning selection value from the privacy-preserving selection process was presented at the client device, and updating, by the first server of the secure MPC system, a privacy-preserving data structure for determining whether digital components satisfy the privacy-preserving anonymity enforcement rule that maintains a first value for a privacy-preserving characteristic corresponding to the second winning selection value from the counterfactual selection process.

These and other implementations can optionally include one or more of the following features. In some implementations, conducting the privacy-preserving selection process and conducting the counterfactual selection process are performed in parallel.

In some implementations, the notification includes a variable that indicates whether the first server of the secure MPC system should increment a value of the privacy-preserving data structure.

In some implementations, the privacy-preserving anonymity enforcement rule is a k-anonymity rule.

In some implementations, transmitting the winning selection value from the privacy-preserving selection process includes transmitting, by the first server of the secure MPC system, a first secret share of the winning selection value from the privacy-preserving selection process to the client device, transmitting, by the second server of the secure MPC system, a second secret share of a the winning selection value from the privacy-preserving selection process to the client device, and transmitting the winning selection value from the counterfactual selection process includes transmitting, by the first server of the secure MPC system, a first secret share of the winning selection value from the counterfactual selection process to the client device, and transmitting, by the second server of the secure MPC system, a second secret share of the winning selection value from the counterfactual selection process to the client device.

In some implementations, the privacy-preserving data structure includes a set of counter variables, where each counter variable is mapped to an aggregate identifier, where each aggregate identifier is mapped to one or more selection values and a particular digital component, and where conducting the privacy-preserving selection process to select a first winning selection value from among a set of selection values by applying each rule of a set of selection rules, including a privacy-preserving anonymity enforcement rule includes, for each selection value: comparing a counter variable value that is mapped to an aggregate identifier that is mapped to the selection value to a threshold, and discarding the selection value if the counter variable value is less than the threshold. In some implementations, updating the privacy-preserving data structure is performed asynchronously and at a specified time interval.

Other embodiments of this aspect include corresponding systems, apparatus, and computer programs, configured to perform the actions of the methods, encoded on computer storage devices.

The subject matter described in this specification can be implemented in particular embodiments so as to realize one or more of the following advantages.

Using a secure MPC process performed by two or more MPC servers operated by different parties to select digital components based on secret shares of user information ensures that the user information cannot be accessed in plaintext or cleartext by either MPC server or another party absent unauthorized collusion between the MPC servers. This MPC process is used to enforce privacy-preserving measures, such as satisfying k-anonymity within a release of data, or anonymity to the extent that information for each user in the release cannot be distinguished from information for at least k–1 other users in the release, or at least k different applications, such as Internet browsers.

The MPC cluster can transmit secret shares of a result that identifies a selected digital component that the MPC cluster selected using the secure MPC process. By sending secret shares of a result for only selected digital components rather than information for all or a large set of digital components similarly reduces consumed bandwidth, latency, processing power, and battery power in transmitting and receiving the result. This also reduces the potential leakage of confidential information of content platforms that submit selection values for digital components to the MPC cluster by limiting the number of digital components for which information is provided to the client device. The described techniques provide a simplified process for maintaining a high level of privacy. By implementing the segmented process through MPC techniques, the system provides a high bar for user privacy without requiring extensive changes from demand-side platforms.

The proposed structure introduces a counterfactual selection process that ignores k-anonymity rules to determine a phantom user group candidate selection criterion. This phantom candidate selection criterion is eligible to win the selection process if the candidate criterion satisfies all rules that determine candidacy except for k-anonymity rules. This phantom user group candidate selection criterion is presented for selection in a client-side selection process performed by a client-side application in addition to an actual user group candidate selection criterion that is known to satisfy k-anonymity rules. Upon completion of the client-side selection process, the client-side application provides an update notification to the MPC cluster to deduplicate phantom user group candidate selection criteria in order to help the MPC cluster to properly maintain counters that track compliance with k-anonymity rules. Based on the counter values, the MPC cluster updates selection process eligibility for cached user group selection criteria. This enables the MPC cluster to track the number of times a digital component corresponding to the phantom user group candidate selection criterion would be displayed at client devices and use this number to determine whether the digital component satisfies k-anonymity requirements. Absent these techniques, the MPC system may not be able to distribute a new digital component as it would not be eligible to be provided. The counterfactual selection process enables the MPC cluster to determine that the digital component, if eligible for the privacy-preserving selection process, whether the digital component would be displayed a sufficient number of times to satisfy k-anonymity. Using k-anonymity prevents individual users from being targeted and prevents entities from being able to determine which user groups include the user as a member.

Furthermore, data that is cached locally at particular computing systems reduces latency for future requests of any cached data. Reducing the latency in content presentation also reduces the number of errors that occur at client devices while waiting for such content to arrive. As the content often needs to be provided in hundreds of milliseconds and to mobile devices connected by wireless networks, reducing the latency in selecting and providing the content is critical in preventing errors and reducing user frustration. Additionally, reducing the need to transmit data reduces the amount of bandwidth consumed to transmit the information, reduces the latency in transmitting the information, and reduces the amount of processing power and associated battery power for devices running on batteries (e.g., mobile devices) required to transmit the information.

Various features and advantages of the foregoing subject matter are described below with respect to the figures. Additional features and advantages are apparent from the subject matter described herein and the claims.

BRIEF DESCRIPTION OF THE DRAWINGS

FIG. 3 is a flow diagram that illustrates an example process for selecting a digital component for distribution to a client device.

Like reference numbers and designations in the various drawings indicate like elements.

DETAILED DESCRIPTION

In general, this document describes systems and techniques for improving the integrity and protecting the security of information in content selection and distribution. An MPC cluster of server computers can perform a secure MPC process to select digital components based on user information without either MPC server being able to access the user information in cleartext absent unauthorized collusion. The user information can be sent to the MPC cluster using probabilistic data structures to reduce the data size of the information being transmitted over a network and to keep the information secure during the transmission.

Figure 1:
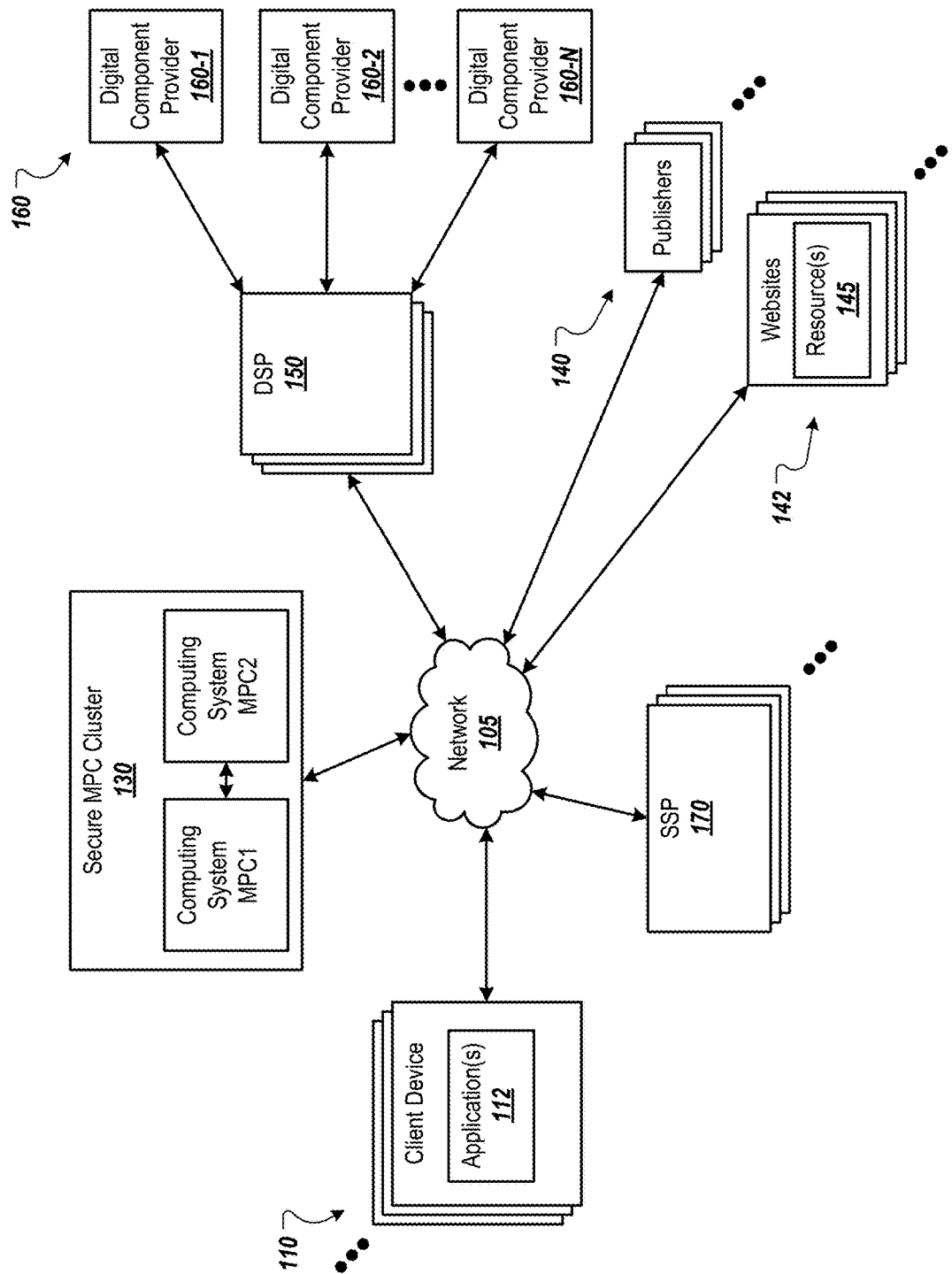
FIG. 1 is a block diagram of an environment in which an MPC cluster performs a secure MPC process to select digital components for distribution to client devices.

FIG. 1 is a block diagram of an environment 100 in which an MPC cluster performs a secure MPC process to select digital components for distribution to client devices 110. The example environment 100 includes a data communication network 105, such as a local area network (LAN), a wide area network (WAN), the Internet, a mobile network, or a combination thereof. The network 105 connects the client devices 110, the secure MPC cluster 130, publishers 140, websites 142, content platforms, e.g., supply-side platforms (SSPs) 170 and demand-side platforms DSPs (150). The example environment 100 may include many different client devices 110, secure MPC clusters 130, publishers 140, websites 142, DSPs 150, and SSPs 170.

A client device 110 is an electronic device that is capable of communicating over the network 105. Example client devices 110 include personal computers, mobile communication devices, e.g., smart phones, and other devices that can send and receive data over the network 105. A client device can also include a digital assistant device that accepts audio input through a microphone and outputs audio output through speakers. The digital assistant can be placed into listen mode (e.g., ready to accept audio input) when the digital assistant detects a "hotword" or "hotphrase" that activates the microphone to accept audio input. The digital assistant device can also include a camera and/or display to capture images and visually present information. The digital assistant can be implemented in different forms of hardware devices including, a wearable device (e.g., watch or glasses), a smart phone, a speaker device, a tablet device, or another hardware device. A client device can also include a digital media device, e.g., a streaming device that plugs into a television or other display to stream videos to the television, a gaming console, or a virtual reality system.

A client device 110 typically includes applications 112, such as web browsers and/or native applications, to facilitate the sending and receiving of data over the network 105. A native application is an application developed for a particular platform or a particular device (e.g., mobile devices having a particular operating system). In some implementations, application 112 can be a program such as an operating system. Publishers 140 can develop and provide, e.g., make available for download, native applications to the client devices 110. A web browser can request a resource 145 from a web server that hosts a website 142 of a publisher 140, e.g., in response to the user of the client device 110 entering the resource address for the resource 145 in an address bar of the web browser or selecting a link that references the resource address. Similarly, a native application can request application content from a remote server of a publisher.

Some resources, application pages, or other application content can include digital component slots for presenting digital components with the resources 145 or application pages. As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component. For example, the digital component may be content that is intended to supplement content of a web page or other resource presented by the application 112. More specifically, the digital component may include digital content that is relevant to the resource content (e.g., the digital component may relate to the same topic as the web page content, or to a related topic). The provision of digital components can thus supplement, and generally enhance, the web page or application content.

When the application 112 loads a resource (or application content) that includes one or more digital component slots, the application 112 can request a digital component for each slot. In some implementations, the digital component slot can include code (e.g., scripts) that cause the application 112 to request a digital component from a digital component distribution system that selects a digital component and provides the digital component to the application 112 for presentation to a user of the client device 110. As described below, the application 112 can request digital components from the MPC cluster 130 and/or one or more SSPs 170.

Some publishers 140 use an SSP 170 to manage the process of obtaining digital components for digital component slots of its resources and/or applications. An SSP 170 is a technology platform implemented in hardware and/or software that automates the process of obtaining digital components for the resources and/or applications. Each publisher 140 can have a corresponding SSP 170 or multiple SSPs 170. Some publishers 140 may use the same SSP 170.

Digital component providers 160 can create (or otherwise publish) digital components that are presented in digital component slots of publisher's resources and applications. The digital component providers 160 can use a DSP 150 to manage the provisioning of its digital components for presentation in digital component slots. A DSP 150 is a technology platform implemented in hardware and/or software that automates the process of distributing digital components for presentation with the resources and/or applications. A DSP 150 can interact with multiple supply-side platforms SSPs on behalf of digital component providers 160 to provide digital components for presentation with the resources and/or applications of multiple different publishers 140. In general, a DSP 150 can receive requests for digital components (e.g., from an SSP), generate (or select) a selection value for one or more digital components created by one or more digital component providers based on the request, and provide data related to the digital component (e.g., the digital component itself) and the selection parameter to an SSP. The selection value can indicate an amount that the digital component provider 160 is willing to provide for presentation or user interaction with the digital component. The SSP can then select a digital component for presentation at a client device 110 and provide, to the client device 110, data that causes the client device 110 to present the digital component.

In some cases, it is beneficial to a user to receive digital components related to web pages, application pages, or other electronic resources previously visited and/or interacted with by the user. In order to distribute such digital components to users, the users can be assigned to user groups, e.g., user interest groups, cohorts of similar users, or other group types involving similar user data, when the users visit particular resources or perform particular actions at the resource (e.g., interact with a particular item presented on a web page or add the item to a virtual cart). The user groups can be generated by the digital component providers 160. That is, each digital component provider 160 can assign users to their user groups when the users visit electronic resources of the digital component providers 160. The user groups can also be created by the content platforms, e.g., by DSPs 150 and/or SSPs 170.

To protect user privacy, a user's group membership can be maintained at the user's client device 110, e.g., by one of the applications 112, or the operating system of the client device 110, rather than by a digital component provider, content platform, or other party. In a particular example, a trusted program (e.g., a web browser or the operating system can maintain a list of user group identifiers ("user group list") for a user using the web browser or another application (e.g., for a user logged into the browser, application, or the client device 110). The user group list can include a group identifier for each user group that includes the user as a member. The digital component providers 160 that create the user groups can specify the user group identifiers for their user groups. The user group identifier for a user group can be descriptive of the group (e.g., gardening group) or a code that represents the group (e.g., an alphanumeric sequence that is not descriptive). The user group list for a user can be stored in secure storage at the client device 110 and/or can be encrypted when stored to prevent others from accessing the list.

When the application 112 presents a resource or application content related to a digital component provider 160, or a web page on a website 142, the resource can request that the application 112 add one or more user group identifiers to the user group list. In response, the application 112 can add the one or more user group identifiers to the user group list and store the user group list securely.

The MPC cluster 130 can use the user group membership of a user to select digital components or other content that may be of interest to the user or may be beneficial to the user/client device in another way. For example, such digital components or other content may include data that improves a user experience, improves the running of a client device or benefits the user or client device in some other way. However, the user group identifiers of the user group list of a user can be provided and used to select digital components in ways that prevent the computing systems MPC1 and MPC2 of the MPC cluster 130 from accessing the user group identifiers for the user in cleartext, thereby preserving user privacy when using user group membership data to select digital components. Cleartext is text that is not computationally tagged, specially formatted, or written in code, or data, including binary files, in a form that can be viewed or used without requiring a key or other decryption device, or other decryption process.

The secure MPC cluster 130 includes two computing systems MPC1 and MPC2 (e.g., server computers) that perform secure MPC processes to select digital components for distribution to client devices of users based on the user's group membership, but without accessing the group membership information in cleartext. Although the example MPC cluster 130 includes two computing systems, more computing systems can also be used as long as the MPC cluster 130 includes more than one computing system. For example, the MPC cluster 130 can include three computing systems, four computing systems, or another appropriate number of computing systems. Using more computing systems in the MPC cluster 130 can provide more security, but can also increase the complexity of the MPC processes.

The computing systems MPC1 and MPC2 can be operated by different entities. In this way, each entity may not have access to the users' group membership in cleartext. For example, one of the computing systems MPC1 or MPC2 can be operated by a trusted party different from the users, the publishers 140, the DSPs 150, the SSPs 170, and the digital component providers 160. For example, an industry group, governmental group, or browser developer may maintain and operate one of the computing systems MPC1 and MPC2. The other computing system may be operated by a different one of these groups, such that a different trusted party operates each computing system MPC1 and MPC2. Preferably, the different parties operating the different computing systems MPC1 and MPC2 have no incentive to collude to endanger user privacy. In some implementations, the computing systems MPC1 and MPC2 are separated architecturally and are monitored to not communicate with each other outside of performing the secure MPC processes described in this document.

Further to the descriptions throughout this document, a user may be provided with controls (e.g., user interface elements with which a user can interact) allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 2:
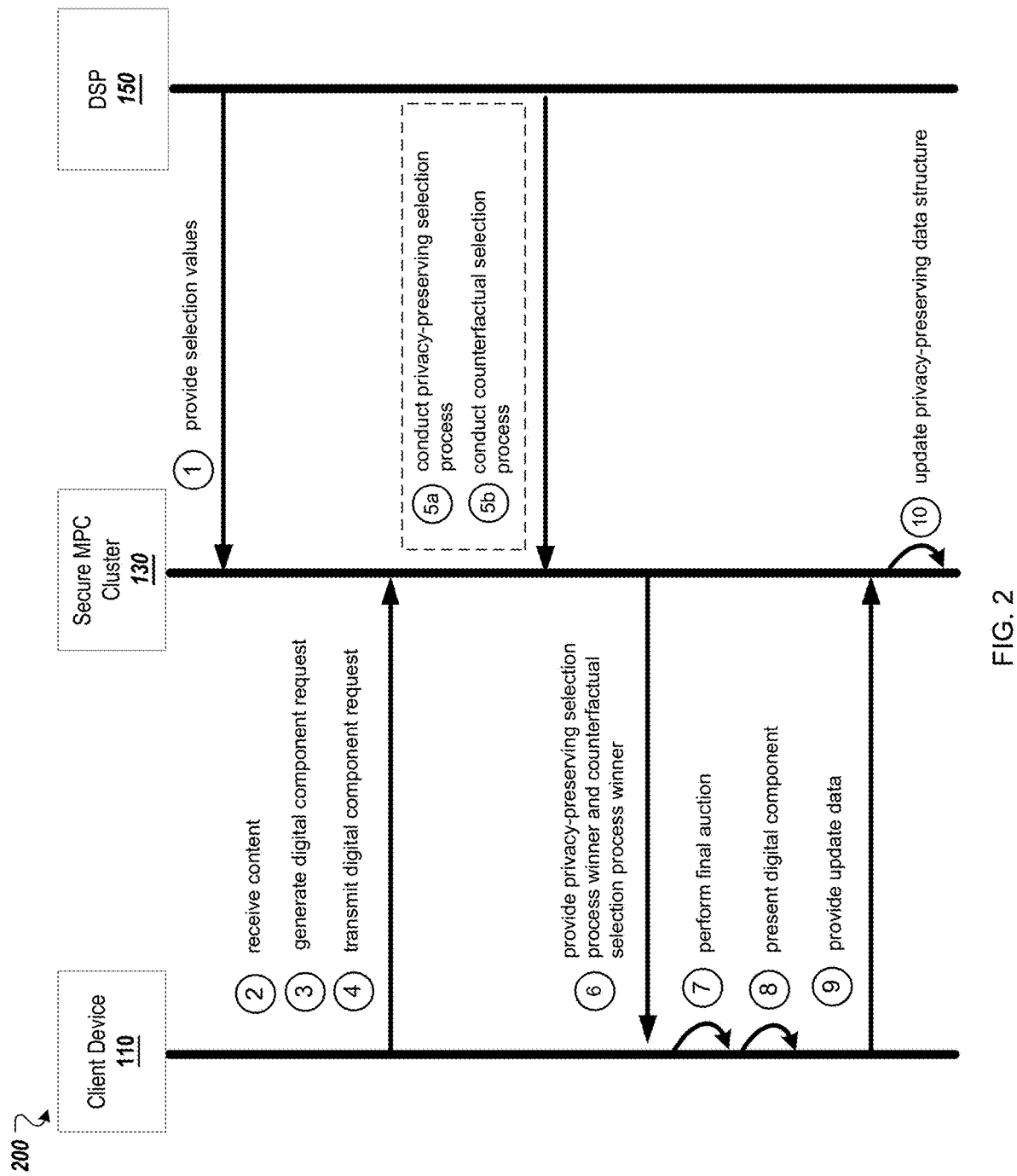
FIG. 2 is a swim lane diagram of an example process for selecting a digital component for provision for display at or distribution to a client device.

FIG. 2 is a swim lane diagram of an example process 200 for selecting a digital component for providing for display at or distribution to a client device. Operations of the process 200 can be implemented, for example, by the application 112 on client device 110, the computing systems MPC1 and MPC2 of the MPC cluster 130, and DSPs 150. Operations of the process 200 can also be implemented as instructions stored on one or more computer readable media which may be non-transitory, and execution of the instructions by one or more data processing apparatus can cause the one or more data processing apparatus to perform the operations of the process 200. Although the process 200 and other processes below are described in terms of a two computing system MPC cluster 130, MPC clusters having more than two computing systems can also be used to perform similar processes. In addition, operations of the process 200 can be implemented by SSPs 170.

The MPC cluster performs a secure MPC process to select a digital component based on the characteristic information in a digital component request, such as the user group information. The user group information can be provided using secret shares, e.g., such that MPC1 gets a secret share of the user group information and MPC gets a second share of the user group information. The user group information can identify one or more user groups that include, as a member, the user of the client device that sent the request. This digital component selection can include identifying eligible selection values for digital components in the two stage lookup table of the computing systems MPC1 and MPC2 using the first stage lookup key. This can also include identifying selection values for digital components that are candidates for selection, for example, based on the digital components having a user group identifier that matches one of the user group identifiers for the user. This can also include selecting a digital component from the candidate digital components based on the selection values for the digital components. This can all be performed without either computing system MPC1 or MPC2 from accessing the user group identifiers in cleartext.

The computing systems MPC1 and MPC2 can identify the candidate selection values using secure MPC techniques using secret shares such that neither computing system MPC2 nor MPC2 knows which digital components are candidates or the user groups that include the user as a member. To do this, computing system MPC1 calculates a first share of a candidate parameter for each digital component in a set of digital components. Similarly, computing system MPC2 calculates a second share of the candidate parameter for each digital component in a set of digital components. The candidate parameter can be a Boolean value (e.g., zero or one) that indicates whether selection values for digital components linked to the user group identifier are candidates. That it, the candidate parameter indicates whether the digital component is linked to distribution criteria that indicates that the digital component is eligible for distribution to users in a user group identified by the user group identifier.

The computing systems MPC1 and MPC2 can compute the secret shares for the result of the selection processes using secure MPC techniques with one or more roundtrips between the computing systems. That is, the computing systems MPC1 and MPC2 can determine the secret shares for the winning selection value and/or its corresponding digital component.

Once the shares are completed, MPC1 and MPC2 can each return one of the shares of the selection result to the client device. The client device can then reconstruct the selection result in cleartext using the two secret shares. The selection result can either include the corresponding digital component or a reference to the corresponding digital component, e.g., a link to download the corresponding digital component.

The flow begins with the DSP 150 providing selection values for digital components to the MPC cluster 130, often via the SSP 170 (stage 1). As described above, the selection value can indicate an amount that the digital component provider 160 is willing to provide for presentation or user interaction with the digital component. The MPC cluster 130 can store the selection values for future digital component requests received from client devices 110. For each digital component, a DSP 150 can also upload additional data, e.g., metadata, for the digital component. The additional data for a digital component can include a user group identifier for a user group corresponding to the digital component, e.g., a user group to which the digital component is eligible to be distributed. For example, the DSP 150 can manage a campaign in which the digital component is distributed to client devices 110 of users that are members of the user group.

The data for a digital component can include contextual selection signals that indicate the context for which the digital component is eligible, e.g., location of client device 110, spoken language selected for the application 112, Universal Resource Locators (URL) for resources with which the digital component can be presented. This data for a digital component can also identify the digital component, e.g., using a unique identifier, a domain from which the digital component can be obtained, and/or other appropriate data for the digital component.

The MPC cluster 130 caches, or otherwise stores, selection values for digital components provided to the MPC cluster 130 for future digital component requests. In this example, the contextual signals for the digital component and the selection value can include the contextual signals included in that digital component request.

In some implementations, each computing system MPC1 and MPC2 stores the selection value for digital components using a two stage lookup table (LUT). The first stage can be keyed by a user group request key. The user group request key can be a composite message that is based on a set of contextual signals, e.g., a set of contextual signals of a digital component request (e.g., URL, location, language, etc.) or a set of contextual signals for which a digital component is eligible for distribution. That is, the first stage LUT can be keyed based on a set of contextual signals. The second stage LUT can be keyed based on a combination of the user group request key in the first stage LUT and a user group identifier. In some implementations, the second stage LUT can be replaced with a simple table without a lookup key. Each row in the second stage LUT can be for a particular selection value for a particular digital component. For example, a DSP 150 can submit different selection values for the same digital component, which each selection value being for a different set of contextual signals and/or different user group identifiers. Thus, the selection values for a digital component can vary based on context.

A DSP 150 or digital component provider 160 can optionally associate, e.g., link or map, a digital component to a user group to which the DSP 150 or digital component provider wants the digital component to be presented. For example, a DSP 150 may want a digital component related to DIY birdhouse building kits be provided for display at a client device to users that have shown an interest in DIY, birds, and/or yard decorations. In this example, the DSP 150 can provide, to the MPC cluster 130, data indicating that the digital component corresponds to the user group identifier for a user group that includes users that have shown an interest in DIY, birds, and/or yard decorations. Furthermore, the same DSP 150 or digital component provider 160 can optionally associate, e.g., link or map, the same digital component to other conditions under which the DSP 150 or digital component provider wants the digital component to be presented, such as specific pacing conditions.

In some implementations, the key for a row in the second stage LUT can be a hash or code generated based on the combination of the user group request key UG_Request_Key and the user group identifier for the digital component of the row. For example, the key can be a hash-based message authentication code (HMAC) of the combination, which can be represented as HMACSHA256(UG_Request_Key, ug_id). The user group identifier ug_id can be based on a combination of an internal user group identifier for the user group and a domain of the owner of the user group (e.g., of the DSP, SSP, or digital component provider that owns the user group). For example, the user group identifier ug_id can be a digital digest, or an HMAC of the combination, of the eTLD+1 of the owner domain and the owner's internal user group identifier for the user group. The eTLD+1 is the effective top-level domain (eTLD) plus one level more than the public suffix. An example eTLD+1 is "example.com" where ".com" is the top-level domain. The ug_id can be truncated to 16 bytes or another appropriate data size.

The value for each row of the second stage LUT can be the selection value for the digital component and other data for the digital component, e.g., metadata that identifies the digital component or the network location from which the digital component can be downloaded, etc. The value can be a digital component information element, which can be a byte array having the selection value and the metadata. The second stage LUT maps a selection value to a particular digital component. In some implementations, the second stage LUT optionally maps a particular user group identifier as well as to a particular set of contextual signals defined by the first stage lookup key. By doing so, the second stage LUT indicates the particular context of a digital component slot for which the selection value for the digital component is eligible. This allows a DSP 150 or digital component provider 160 to specify different selection values for the same digital component for different contexts defined by the contextual signals and, optionally, a user's group membership or other conditions for content delivery. When a digital component request is received that indicates that the user to which the digital component will be presented is a member of a particular user group identified by a particular user group identifier and the digital component will be presented in a particular context defined by the contextual signals of the first stage lookup key, any selection values in the second stage LUT that has a matching user group identifier and a matching first stage lookup key is a candidate for being selected for distribution in response to the request.

The client device 110 receives content (stage 2). For example, the client device 110 can receive an electronic resource (e.g., web page) for presentation by a web browser or application content for presentation by a native application. The content can include one or more digital component slots that include computer-readable code, e.g., scripts, that, when executed, cause the client device 110 to request a digital component for each slot. The client device 110 can render the content on a display of the client device 110.

The client device 110 generates a request for one or more digital components based on the received content (stage 3). The request includes data indicating characteristics of the content and the context in which the digital component will be presented. For example, the request can include one or more categories (DIY, birds, nature preservation) for the received content, user groups of which the user is a member, the location and/or size of the digital component slot, the length of time that the digital component will be displayed, among other characteristics. As described above, the user group identifiers can be sent as secrete shares to prevent either MPC computing system from accessing the user's membership information in plaintext. If a resource in which the content is displayed includes multiple digital component slots, the client device 110 can request a respective digital component for each slot from the MPC cluster 130 and from the SSP 170. The request can also include an identifier for the particular distribution opportunity and/or the digital component slots in which the selected digital components are to be displayed.

The client device 110 then transmits the request for a digital component to the MPC cluster 130 (stage 4). For example, the client device 110 can directly transmit the request for a digital component to MPC cluster 130. In some implementations, client device 110 can transmit the request for a digital component to the SSP 170 (or DSP 150), and the SSP 170 (or the DSP 150) may forward the request to the MPC cluster 130. In some implementations, this request may not include the user group information.

The MPC cluster 130 performs a privacy-preserving selection process based on the request to select a winning digital component having a particular selection value (stage 5a). For example, the selection process can be in the form of an auction that is held to select the digital component that is both eligible and has the highest selection value that meets a threshold value (e.g., k-anonymity) specified by the MPC cluster 130 or the client device 110. In order for the digital component to be eligible for the selection process, the digital component must meet certain distribution requirements. For example, the digital component must satisfy particular rules specified by one or more digital component providers 160, the client device 110, the user of client device 110, and/or the MPC cluster 130 itself. The rules can include restrictions and guidelines on the manner or frequency of distribution of a digital component, among other factors. The rules include frequency control, muting, budget, and pacing constraints. The privacy-preserving selection process includes one additional rule—the privacy-preserving rule that enforces the anonymity of a particular user's data. For example, the privacy-preserving rule is implemented as a k-anonymity rule.

First, the computing systems MPC1 and MPC2 determine whether a particular cached selection value and its corresponding digital component are eligible to be a candidate for the privacy-preserving selection process being executed according to the data provided in the digital component request from the client device 110.

Each selection value x is associated with an aggregation identifier, represented as aggregate_id, upon which the MPC cluster 130 will enforce k-anonymity. For example, the aggregation identifier can be the digital digest (e.g., SHA256) of the digital component. The MPC cluster 130 also implements a function aggregate_id to extract the aggregation identifier from a selection value x. For example, the MPC cluster 130 can apply aggregate_id(x) to determine the value of aggregate_id of selection value x.

The MPC cluster 130 determines k-anonymity eligibility for a digital component mapped to a particular aggregate_id and to one or more selection values using a variable satisfy_k_anonymityx, which represents whether the selection value x for the digital components satisfies k-anonymity. The variable satisfy_k_anonymityx=1 if and only if x satisfies k-anonymity. Otherwise, the variable satisfy_k_anonymityx=0. The value of satisfy_k_anonymityx is calculated by comparing the value of a counter, represented by variable counteraggregate_id(x) against a threshold k for k-anonymity. For example, computing system MPC1 can calculate a secret share of the value of satisfy_k_anonymity$_x$ in secret shares using the following equation.

$$[\text{satisfy\_k\_anonymity}_{aggregate\_id(x),1}] = \qquad \text{Equation (1)}$$
$$[\text{counter}_{aggregate\_id(x),1}] > k$$

The computing system MPC2 can calculate a secret share of the value of satisfy_k_anonymity$_x$ in secret shares using a similar equation as follows:

$$[\text{satisfy\_k\_anonymity}_{aggregate\_id(x),2}] = \qquad \text{Equation (2)}$$
$$[\text{counter}_{aggregate\_id(x),2}] > k$$

As described in further detail below with respect to stage 10, the MPC cluster 130 can update the value of satisfy_k_anonymityx based on the value of the counter variable counteraggregate_id(x).

The concept of k-anonymity ensures that data for a particular user is not distinguishable from the data of a threshold number k of other users. The system can enforce a k-anonymity rule, for example, by ensuring that a particular digital component is distributed to a client device 110 in response to a request for one or more digital components, and the same digital component could have been, or was, presented to a set of at least k users or by at least k browsers within a particular period of time. In some implementations, each of the k browsers to which the digital component could have been, or was distributed must be for a different user.

The system enforces k-anonymity through the use of a privacy-preserving data structure. The distribution of a particular digital component can be tracked within a privacy-preserving data structure, such as a counter for the number of times that the digital component has been selected for distribution or display, e.g., to different users or using different browsers. As described in further detail below with respect to stage 8, the counter can be incremented for a digital component when the digital component is selected through the privacy-preserving selection process and subsequently distributed to a client device. The counter tracks the number of, for example, browsers or users that could have seen, or did see a particular digital component within a period of time. For example, the counter can count the number of browsers that could have seen, or did see, a particular digital component within the most recent 12 hours. Because the counter tracks this information over a most recent period of time, the counter increments when data indicating that the digital component was, or could have been presented, and decrements as time passes. For example, the counter can be automatically decremented when the specified period of time passes for each presentation or potential presentation. The counter can track, for example, a period of time that has passed since a presentation or potential presentation was added to the counter total. In some implementations, the counter can store a timestamp of when each presentation or potential presentation was added to the counter total. When the specified period of time has passed, the counter can automatically decrement by the number of presentations or potential presentations that have expired.

Additionally, users generally prefer to not be continually shown the same third-party content as they navigate across multiple different websites, such that continually distributing the same third-party content to the same user across multiple different websites results in wasted computing resources that are used to distribute content that the user does not want to see, and will likely ignore. One way to limit the number of times a particular user is exposed to the same third-party content is to utilize frequency control techniques that prevent the same user from being exposed to the same third-party content more than a specified number of times within a period of time.

The system allows for further user input by receiving information from the user to mute a digital component, or prevent a digital component from being presented to them for a period of time. For example, a user can choose to mute a particular digital component that they have been presented with for a period of five days. In some implementations, the time period can be specified by the client device 110, MPC cluster 130, DSP 150, digital content provider 160, or SSP 170, based on the type of content item and/or the type of feedback provided by the user, among other factors.

The distribution of content can also be controlled by input from the digital component providers 160 through budget and pacing control techniques. A digital component provider can specify a total threshold value over a period of time for the selection values to implement measures to ensure that resources for a campaign that includes the digital component are not exhausted early in a campaign period. For example, a digital component provider 160 can specify that the total of selection values for selected digital components from the digital component provider 160 or for a particular digital component over the course of a week is limited to a maximum value of 8000 units. Once the maximum total of selection values is reached, the particular digital component for which the maximum is imposed will no longer be eligible for a selection process to be distributed to a client device 110 until the period of time, the week, is over.

A digital component provider can also specify a velocity, or a pace, at which a threshold value of selection values for selected digital components from the digital component provider 160 or for a particular digital component is being reached. For example, a digital component provider 160 can specify that a maximum threshold value of 6000 units must be reached at a pace of less than 250 units per day over the course of a month. Once the daily total of selection values is reached, digital components provided by the digital component provider 160 for which the pacing is imposed will no longer be eligible for a selection process to be distributed to a client device 110 until the period of time, the day, is over.

In addition to enforcing digital component eligibility according to content distribution rules, the privacy-preserving selection process protects a user's privacy and improves user experience by preserving the k-anonymity of the user (or browser) such that any components that are selected are provided to at least k other users (or browsers). By ensuring that a particular digital component is provided to a threshold number of other users, the system prevents a form of user targeting, known as microtargeting, which narrowly targets users to an extent that some users may not feel comfortable with. For example, a digital component that is targeted at, and distributed to, only a few users may feel too personalized, and a user may feel singled out or uncomfortable with the specificity of the digital component. The privacy-preserving selection process ensures that digital components are distributed to a sufficiently broad audience such that a user feels comfortable with the digital components they receive and with the size of the digital component's target audience.

The computing systems of the MPC cluster 130 can indicate that a selection value is a candidate for the privacy-preserving selection process using a Boolean variable is_candidatex. The variable is_candidatex=1 if and only if x satisfies all of the distribution rules applied in the privacy-preserving selection process. Otherwise, the variable is_candidatex=0.

Next, each of the computing systems of the MPC cluster 130 determines an order of the selection values that are eligible to be candidates for the privacy-preserving selection process. For example, each computing system MPC1 and MPC2 can determine an order of the eligible selection values in its second stage LUT. This order can include all of the eligible selection values in the second stage LUT, including the candidate selection values. In some implementations, this order can include the selection values that are not candidates. The order can be from the highest selection value to the lowest selection value. In some implementations, the selection values used for the order can be the value that would be provided to the publisher of the resource with which a selected digital component would be presented, e.g., after any sharing with a DSP 150 and/or SSP 170. As the selection values are in cleartext, the computing systems MPC1 and MPC2 do not have to perform any roundtrip computations to order the selection values. Instead, each computing system MPC1 and MPC2 can order the selection values of its second stage LUT independently.

The structure of the MPC cluster 130 allows for additive secret sharing, which involves breaking a secret into fragments that add up to the original secret. Once divided into fragments, each fragment is distributed to different participants, and none of the individual participants has enough information to reconstruct the secret. To reconstruct the secret, all fragments must be pooled together to reveal the original secret. If the selection values were stored as secret shares at each computing system MPC1 and MPC2, with each computing system MPC1 and MPC2 having a respective secret share of each selection value, the computing systems MPC1 and MPC2 can perform a secure MPC process using roundtrip computations to order the selection values.

Once the selection values have been ordered, the MPC cluster 130 completes the privacy-preserving selection process by selecting a winner. For example, the MPC cluster 130 determines a winner by calculating the value of a variable is_pp_winner$_x$ for each candidate selection value cached by the MPC cluster 130.

$$\text{is\_pp\_candidate}_x = \text{is\_candidate}_x \times \text{satisfy\_k\_anonymity}_x \quad \text{Equation (3)}$$

The variable satisfy_k_anonymity$_x$ is a Boolean variable that indicates whether the candidate selection value x satisfies k-anonymity. In Equation (3), both is_candidate$_x$ and satisfy_k_anonymity$_x$ must be true, or 1, in order for is_pp_candidate$_x$ to be true.

In this example, Equation 3 is written in terms of multiplication. Conceptually, Equation 3 can be performed using a logical AND operation. In some implementations, this logical expression can be performed directly, without being converted into a multiplication operation.

In one example, MPC1 calculates [is_pp_candidate$_{x,1}$] using the following equation.

$$[\text{is\_pp\_candidate}_x] = \quad \text{Equation (4)}$$
$$[\text{is\_candidate}_{x,1}] \times [\text{satisfy\_k\_anonymity}_{x,1}]$$

Where parameters appearing in brackets, such as [is_pp_candidate$_{x,1}$], represent secrets shares of the variable within the brackets. For example, [is_pp_candidate$_{x,1}$] represents a first secret share of is_pp_candidate$_x$ only known to MPC1. Computing the secret shares of bracketed parameters may require roundtrip remote procedure calls (RPCs) between the computing systems of the MPC cluster 130.

MPC2 calculates [is_pp_candidate$_{x,2}$] using a similar equation.

$$[is\_pp\_candidate_x] = [is\_candidate_{x,2}] \times [satisfy\_k\_anonymity_{x,2}] \quad \text{Equation (5)}$$

The calculations represented by Equations (4) and (5) are performed at the same time as part of a secure 2PC protocol. Additionally, these calculations are particularly efficient because the × (multiplication) operation requires only one round of communication between the computing systems MPC1 and MPC2, whereas the == (equality) operation requires three rounds of communication between the computing systems MPC1 and MPC2, and the > (greater than) operation requires more than three rounds of communication between the computing systems MPC1 and MPC2. For example, the computing systems MPC1 and MPC2 can engage in multiple rounds of computations, e.g., multiple RPCs, as part of a secure MPC process to perform the equality comparison. At the end of this process, computing system MPC1 has, for each selection value, one secret share of the result, and computing system MPC2 has, for each selection value, the other secret share of the result. The calculations represented by Equations (4) and (5) reduce the number of communications required between the computing systems MPC1 and MPC2 relative to performing the operation using comparison operations such as equality or greater than operations, thereby reducing transmission traffic and overall computing resources required to complete the calculations.

Conceptually, an accumulated value for a given selection value for a digital component represents a total number of candidate selection values from the top of the order to the given selection value. For example, the MPC cluster 130 calculates an accumulated value pp_acc$_x$ that represents a total number of eligible candidate selection values in the privacy-preserving selection process ranked in front of selection value x using the following equation.

$$pp\_acc_x = \sum is\_pp\_candidate_b \quad \text{Equation (6)}$$

The variable b represents a candidate selection value b ranked in front of selection value x based on the selection values. Because is_pp_candidate$_b$ has previously been calculated for each of the eligible selection values b, the calculation of Equation (6) requires no communication between the computing systems MPC1 and MPC2 and simply requires a summation, assuming that the appropriate secret share algorithms are adopted.

Once the selection values have been ordered, the MPC cluster 130 completes the privacy-preserving selection process by selecting a winner. The MPC cluster can calculate the result of the privacy-preserving selection process by determining the value of variable is_pp_winner$_x$ for each cached eligible candidate selection value using the following equation.

$$is\_pp\_winner_x = is\_pp\_candidate_x \times (pp\_acc_x == 0) \quad \text{Equation (7)}$$

The variable is_pp_winner$_x$=1 if and only if x is the winner of the privacy-preserving selection process. Otherwise, the variable is_pp_winner$_x$=0. Because pp_acc$_x$ has already been calculated, by using the value of the variable pp_acc$_x$ in Equation (7), the MPC cluster 130 can determine whether a particular cached selection value is the winner using a simple operation.

The computing system MPC1 holds [is_pp_winner$_{x,1}$]. The computing system MPC2 holds [is_pp_winner$_{x,2}$]. Each of [is_pp_winner$_{x,1}$] and [is_pp_winner$_{x,2}$] represents a secret share of the variable is_pp_winnerx.

The MPC cluster 130 performs a counterfactual selection process (stage 5b). The counterfactual selection process can be performed in parallel with, or before, the privacy-preserving selection process. The MPC cluster 130 can conduct both of the selection processes in parallel in, for example, a batch mode without increasing the number of RPCs between the computing systems MPC1 and MPC2. The result of the counterfactual selection process is_winner$_x$ allows the MPC cluster 130 to update privacy-preserving data structures to determine whether a selection value x satisfies k-anonymity rules. The final selection process performed by the client device 110, however, only considers the selection value x having a is_pp_winner$_x$ value of 1, i.e., the winner of the privacy preserving-selection process.

The counterfactual selection process can have the same form as the privacy-preserving selection process, and in order for the digital component to be eligible for the selection process, the digital component must meet certain distribution requirements. The counterfactual selection process measures what would have happened in the absence of the application of k-anonymity rules by applying all of the distribution rules that the privacy-preserving selection process applies with the exception of the privacy-preserving rule. Because the counterfactual selection process does not apply the privacy-preserving rule, digital components that are otherwise eligible to be selected and provided to a client device but have not been distributed to other client devices at least a threshold number of times can be selected during the counterfactual selection process. This process is particularly advantageous because it allows the system to track the selection rate, for example, for newly offered digital components that have not been distributed before, or have not met the threshold number of distributions, and therefore would not qualify to be distributed to users under the privacy-preserving selection process. Without the counterfactual selection process, such digital components may never become eligible for selection in the privacy-preserving selection process, and thus the final selection process, and it is possible that those digital components would never be provided to a client device.

The counterfactual selection process allows the system to determine whether a particular digital component would have been eligible to be distributed if it had been compliant with the anonymity rule. As described above with respect to the privacy-preserving selection process, this potential distribution can be tracked within a privacy-preserving data structure, such as a counter for the number of times that the digital component has been selected for distribution. As described in further detail below with respect to stage 8, the counter can also be incremented for a digital component even when the digital component is not selected through the privacy-preserving selection process and subsequently distributed to a client device, and is instead selected through the counterfactual selection process.

The concept of k-anonymity ensures that data for a particular user is not distinguishable from the data of a threshold number k of other users. By incrementing the counter for a particular digital component when the digital component would have won a final selection process and been distributed to a client device but for the privacy-preserving rule, the system solves the problem of being unable to distribute a digital component when it has not had the opportunity to be distributed to a threshold number of people and is able to continue enforcing k-anonymity for other digital components.

As described above with respect to the privacy-preserving selection process, the MPC cluster 130 performs the same secure MPC process to select a digital component based on the characteristic information in the digital component request.

Conceptually, the accumulated value for a given selection value for a digital component represents a total number of candidate selection values from the top of the order to the given selection value. For example, each of the computing systems MPC1 and MPC2 can calculate accx, which is the number of eligible selection values in the selection process ranked in front of a selection value x based on the values.

Once the selection values have been ordered, the MPC cluster 130 completes the privacy-preserving selection process by selecting a winner. The MPC cluster can calculate the selection process result by determining the value of variable is_winner$_x$ for each cached selection value.

$$\text{is\_winner}_x = \text{is\_candidate}_x \times (acc_x == 0) \qquad \text{Equation (8)}$$

The variable is_winner$_x$=1 if and only if x is the winner of the privacy-preserving selection process. Otherwise, the variable is_winner$_x$=0.

In some implementations, the calculation of accx is an inclusion calculation that includes the selection value x, and therefore Equation (8) would use acc$_x$=1.

The computing system MPC1 holds [is_winner$_{x,1}$]. The computing system MPC2 holds [is_winner$_{x,2}$]. Each of [is_winner$_{x,1}$] and [is_winner$_{x,2}$] represents a secret share of the variable is_winner$_x$.

In some implementations, the digital components having the selection values that have is_pp_winner$_x$=1 and is_winner$_x$=1 can be the same digital components. However, the digital components having the selection values that have is_pp_winner$_x$=1 and is_winner$_x$=1 are usually different digital components.

The MPC cluster 130 provides the privacy-preserving selection process winner to client device 110 and provides the counterfactual selection process winner to client device 110 (stage 6).

The MPC cluster 130 provides the winners, or selection results, of the privacy-preserving selection process and the counterfactual selection process to client device 110 in response to the digital component request from client device 110 transmitted to the MPC cluster 130 in stage 3. The computing system MPC1 can return the first share of a selection result to the client device 110. Similarly, the computing system MPC2 can return the second share of the selection result to the client device 110.

The selection results for the privacy-preserving and the counterfactual selection process can be in the form of byte arrays that include information about the selected digital component that corresponds to the actual value or the phantom value. To perform the calculation in secret shares, computing system MPC1 takes all of the cached selection values and multiplies the digital component information element for the selection value, which can be in cleartext, by the first secret share of the winner parameter, e.g., [is_pp_winner$_{x,1}$] or [is_winner$_{x,1}$]. The computing system MPC1 can then determine the sum of these products and return the sum to the client device 110 that submitted the digital component request. The computing system MPC2 can perform a similar calculation to determine the second share of the result.

For example, the selection result can be a byte array that includes the value for the digital component in the second LUT, e.g., the selection value for the digital component and the metadata for the digital component. To prevent the computing systems MPC1 and MPC2 knowing the selected digital component, the computing systems MPC1 and MPC2 can be prevented from sharing their secret shares of the selection result with each other.

The MPC cluster 130 provides the selection result for either zero or one cached selection value that is eligible for presentation at the client device 110 and is the winner of the privacy-preserving selection process. If the MPC cluster 130 provides a winner of the privacy-preserving selection process, the selection value is compliant with all of the rules, such as frequency control, muting, budget, pacing, and k-anonymity rules. This winner is the selection value x for which is_pp_winner$_x$=1, and this is the only selection value used by client device 110 in its final selection process. This winner is known as the actual value.

The MPC cluster 130 also provides the selection result for either zero or one cached selection value that is the winner of the counterfactual selection process. If the MPC cluster 130 provides a winner of the counterfactual selection process, the selection value is compliant with all of the rules, except for the k-anonymity rules. This winner is the selection value x for which is_winnerx=1, and this selection value is not used by client device 110 in its final selection process. This winner is known as the phantom value. Because the client device will never present the digital component mapped to the phantom value to the user or allow the user to interact with the digital component mapped to the phantom value, the MPC cluster 130 may optionally strip off the code (e.g. Javascript) and assets (e.g. HTML, CSS, JPG) embedded in the phantom value that is necessary to render the phantom value and to enable user interaction with the phantom value, reducing battery and bandwidth consumption for mobile devices.

In some implementations, each of the actual value and the phantom value selected for a particular distribution opportunity can indicate the distribution opportunity in response to which the actual value and the phantom value were selected. For example, an identifier for the distribution opportunity can be included within each of the actual value and the phantom value or transmitted to client device 110 with the actual value and the phantom value. In some implementations, an identifier for the distribution opportunity can be mapped to the is_winner and is_pp_winner variables for each selection value. In other implementations, an identifier for the distribution opportunity can be mapped to each selection value.

The client device 110 can then reconstruct the selection results in cleartext using the secret shares. For example, the application of 112 can reconstruct the selection result by determining a sum of the secret shares. If the selection result has a value of zero, then the MPC cluster 130 did not identify a digital component for a user group that includes the user as a member.

Client device 110 performs a final selection process including the winning selection criteria it receives from the MPC cluster 130 (stage 7).

In some implementations, the client device 110 can request a digital component based on user group membership from the MPC cluster 130. The client device 110 can also request digital components based on contextual signals from an SSP 170. These contextual signals can include the same contextual information described above, and optionally additional contextual signals such as the number of digital component slots of the resource, the types of digital component slots, the types and/or format of digital components that can be presented with the resource, etc. The SSP 170 can select one or more digital components based on the contextual signals and selection values for the digital components and provide one or more of the selected digital components (or data identifying the digital components) and the selection values for the digital component(s) to the client device 110. The client device 110 can then select, from a set of digital components that include the digital component of the actual value received from the MPC cluster 130 and digital component(s) selected by the SSP 170, a digital component to present with content at client device 110. For example, client device 110 can perform a final selection process using selection values cached at the client device 110 in addition to the selection values it receives from the MPC cluster 130. In some implementations, client device 110 can receive winning selection values from more than one MPC cluster 130, more than one SSP 170, and/or more than one DSP 150.

Although the MPC cluster 130 provides the winning selection from both the privacy-preserving selection process and the counterfactual selection process, client device 110 only considers the winner of the privacy-preserving selection process, the selection value x for which is_pp_winnerx=1, or the actual value. By receiving the actual value and the phantom value but considering only the actual value, the MPC cluster 130 provides a user with a high level of privacy by enforcing k-anonymity for the digital components that are selected for distribution while allowing digital components that have not yet met the requirements for k-anonymity to be tracked and increase their respective k-anonymity count such that the digital components have the opportunity to meet the requirements for k-anonymity. In some implementations, the final selection process can have additional rules. For example, the final selection process can include an additional rules regarding the frequency with which a particular digital component corresponding to a selection value can be shown.

Application 112 of client device 110 performs the final selection process according to a method similar to the process as described with respect to the privacy-preserving and counterfactual selection process. For example, a web browser 112 installed on client device 110 can perform a final selection process by ordering and ranking the candidate selection values. The web browser 112 then chooses the selection value ranked first as the winner of the final selection process.

The client device 110 determines a digital component that corresponds to the winner of the final selection process and presents the digital component (stage 8). For each selection result for which the client device 110 receives two secret shares from the computing systems MPC1 and MPC2, the client device 110 can determine the selection result from the two secret shares. For example, using an additive secret share library, the client device 110 can add the two secret shares of the selection result together to obtain the selection result in cleartext. This gives the client device 110 access to the selection value for the digital component and the metadata for the digital component, e.g., the identity of the digital component, the location from which the client device 110 can download the digital component, etc. If the selection result is not zero, the selection result has a value equal to a digital component information element, the application 112 can parse the digital component information element to obtain the selection value and the metadata for the digital component. The application 112 can then present the digital component with the content received at client device 110. For example, application 112 can cause the display of the digital component and the content on a display of client device 110.

If and only if the actual value (the selection value x for which is_pp_winnerx=1) is the winning candidate selection value of the final selection process performed by client device 110, client device 110 provides update data to the MPC cluster 130 (stage 9). For example, application 112 on client device 110 may transmit a notification containing information regarding the winning candidate selection value and regarding the k-anonymity eligibility of the actual value that was the winning candidate selection value and the phantom value that was provided with the actual value. The update data is provided to the MPC cluster 130 only if the actual value is the winning candidate selection value of the final selection process, because it is only when a selection value is the winning candidate selection value of the final selection process that the digital component mapped to the selection value will be presented at client device 110.

Application 112 on client device 110 transmits a notification containing information regarding the winning candidate selection value and the digital component associated with the candidate selection value to the MPC cluster 130. The notification indicates that the winning candidate selection value from the final selection process is the actual value provided by the MPC cluster 130 and that the digital component associated with the winning candidate selection value was presented at client device 110, e.g., was rendered at client device 110.

Because the notification is only transmitted if the actual value is the winning candidate selection value, the MPC cluster 130 will receive information regarding the winners of its own privacy-preserving and counterfactual selection processes. The notification can identify, for example, the winning candidate selection value by an identifier such as an aggregate_id or other information specific to the selection value. The notification can be triggered by various actions associated with the presentation of the digital component linked to the winning candidate selection value, including the rendering of the digital component by the application 112, the slotting of the digital component into content to be presented at the application 112, among other actions.

This notification allows application 112 to provide deduplication functionality by including two Boolean values. The first variable—is_distinct_phantom_value—is true if and only if, at the time the application 112 was triggered to send the notification, it was the first time during a specified recent period of time that application 112 has received the phantom value as a phantom value that is not to be used in a final selection process. For example, is_distinct_phantom_value is true when, at the time that the application 112 receives the phantom value, it is the first time that the application 112 has received the phantom value within the last four hours, if the specified time period for the system is four hours. The variable is_distinct_phantom_value allows an application to ensure that the counter for the number of times that the digital component associated with the phantom value is distributed is not incremented for duplicate final selection processes in which the same phantom value wins the preceding counterfactual selection process when the selection processes are too close in time. When the selection processes are too close in time and are for the same application 112 of the client device 110, the counter for the number of times that the digital component associated with the phantom value is distributed may not necessarily be incremented because this may represent a situation in which the digital component associated with the phantom value would not be distributed due to frequency control rules or other content distribution restrictions.

Additionally, because k-anonymity as used herein applies to k different browsers, if the period of time that the counter looks back for k-anonymity is 2 days, for example, during this period of time, the browser will at most ask the MPC cluster 130 to increment the k-anonymity counter for a particular digital component once. Furthermore, because the process is performed using secret shares, the MPC cluster 130 will not be able to detect if, for a particular digital component request, the phantom value and the actual value are the same, the browser will ask the MPC cluster to increment the counter associated with one of the phantom value, or the actual value, chosen at random.

The second variable—is_distinct_actual_value—is true if and only if, at the time the application 112 was triggered to send the notification, it was the first time during a specified period of time that application 112 has taken an action related to presenting the digital component associated with the actual value, and the actual value is distinct from the phantom value. For example, is_distinct_actual_value is true when, at the time that the application 112 renders the digital component for presentation at client device 110, it is the first time that the application 112 has rendered the digital component for presentation at client device 110 within the past day, if the specified time period for the system is one day. This variable allows the system to determine whether, for example, the winners of the privacy-preserving selection process and the counterfactual selection process correspond to the same digital component. Each of the computing systems MPC1 and MPC2 of the MPC cluster 130 only hold a share of an identifier of each winner, and thus are unable to determine whether the winners correspond to the same digital component. The client device 110, however, holds the winners in cleartext, and can inform the MPC cluster 130 of any duplications through this variable.

For example, if a particular digital component is selected to be presented to the same application 112 fifty times in a row, client device 110 would include information in the notification to the MPC cluster 130 that the k-anonymity counter for the digital component would be incremented only once (because it was shown to the same browser within a short period of time), but other characteristics such as budget, pacing, frequency control, and muting would be incremented and tracked normally.

By providing an update that includes a request to update k-anonymity counter, the browser provides deduplication functionality to the MPC cluster 130 and its record-keeping. This notification allows the MPC cluster to maintain integrity of its records and ensure that a particular digital component meets the k-anonymity requirement without inflated numbers from a counting process in which the same digital component is served multiple times to the same browser within a short amount of time. For example, if the client device 110 requests more than one digital component within the same request, the notification information allows the MPC cluster 130 to give credit to the digital component for only one of them for the purpose of k-anonymity counting since the browser is for the same user.

In some implementations, the MPC cluster 130 can include additional logic that deduplicates selection of a particular digital component for the same user across different client devices and applications. For example, the system can perform a check for credentials to determine whether the same user is associated with different client devices and applications, and can perform deduplication for different browsers or devices for which the same user has entered credentials identifying themselves. For example, if the user is signed in to a browser on their smartphone and signed in to a browser on their laptop, the system can determine that the same user is signed in using a synchronization mechanism between the browsers based on the user's credentials.

Upon receiving the update data, the MPC cluster 130 updates a privacy-preserving data structure maintained within storage media accessible to the MPC cluster 130 (stage 10). The update data can be, for example, an impression notification that includes the values of is_distinct_phantom_value and is_distinct_actual_value. The MPC cluster 130 can update, for example, values of counter variables maintained by the MPC cluster 130 for tracking k-anonymity. For example, the counter variables may be cached by the MPC cluster 130.

The MPC 130 cluster will update the counter for k-anonymity for the phantom value when receiving an impression notification from the browser indicating that is_distinct_phantom_value is true. In this case, based on the impression notification, the MPC cluster 130 can look up the selection value for which is_winnerx=1 from local storage of the MPC cluster 130 or other locations. The impression notification can include an identifier of the distribution opportunity, and the MPC cluster 130 can look up the selection value for which is_winnerx=1 and which is mapped to the distribution opportunity identifier. Regardless of the format in which the information is encoded and transmitted to the MPC cluster 130, the MPC cluster 130 can look up the selection value and update the corresponding counter variable. For example, the computing system MPC1 holds [is_winner$_{x,1}$] and MPC2 holds [is_winner$_{x,2}$]. Thus, each of the computing systems can individually update the corresponding counter variable for the selection value share. In some implementations, the MPC cluster 130 will update all counters related to all eligible digital components, i.e. counter$_x$=counter$_x$+is_winner_x. If is_winner$_x$=0, the update performs no operation. If is_winner_x=1, the update is equivalent to an increment operation. Thus, any individual computing system in the MPC cluster 130 cannot access any user information without collusion with the other computing systems in the MPC cluster 130.

In some implementations, each computing system of the MPC cluster 130 has separate storage that is not accessible by the other computing systems. This separated storage system reduces the likelihood of collusion to the detriment of user privacy between the computing systems of the MPC cluster 130 and maintains the integrity of the selection and updating process as performed within the system.

The MPC cluster 130 maintains a list of counters for each possible aggregate_id across all possible cache keys. If is_distinct_actual_value is TRUE, for any aggregate_id ($\forall$aggregate_id), the MPC cluster 130 increases a counter variable counter$_{aggregate\_id}$ by the sum of all values of is_pp_winner$_x$ for any selection value x where aggregate_id(x)==aggregate_id according to the following equation.

$$\sum \text{is\_pp\_winner}_x \text{ for any selection} \qquad \text{Equation (9)}$$
$$\text{value where aggregate\_id } (x) == \text{aggregate\_id}$$

In some implementations, the computing system MPC1 can perform this incrementing process by iterating through all possible selection values according to the following equation.

$$[\text{counter}_{aggregate\_id(x),1}] = \qquad \text{Equation (10)}$$
$$[\text{counter}_{aggregate\_id(x),1}] + [\text{is\_pp\_winner}_{x,1}]$$

The computing system MPC2 performs a similar process according to the following equation.

$$[\text{counter}_{aggregate\_id(x),2}] = \qquad \text{Equation (11)}$$
$$[\text{counter}_{aggregate\_id(x),2}] + [\text{is\_pp\_winner}_{x,2}]$$

Similarly, the MPC cluster can update the counter for anonymity for the phantom value when receiving an impression notification from the browser indicating that is_distinct_ phantom_value is true. In this case, based on the impression notification, the MPC cluster 130 can look up the selection value for which is_winner$_x$=1 from local storage of the MPC cluster 130 or other locations. The impression notification can include an identifier of the distribution opportunity, and the MPC cluster 130 can look up the selection value for which is_winner$_x$=1 and which is mapped to the distribution opportunity identifier.

For any aggregate_id ($\forall$aggregate_id), the MPC cluster 130 increases a counter variable counter$_{aggregate\_id}$ by the sum of all values of is_winner$_x$ for any selection value x where aggregate_id(x)==aggregate_id according to the following equation.

$$\sum \text{is\_pp\_winner}_x \text{ for any selection} \qquad \text{Equation (12)}$$
$$\text{value where aggregate\_id } (x) == \text{aggregate\_id}$$

In some implementations, the computing system MPC1 can perform this incrementing process by iterating through all possible selection values according to the following equation.

$$[\text{counter}_{aggregate\_id(x),1}] = \qquad \text{Equation (13)}$$
$$[\text{counter}_{aggregate\_id(x),1}] + [\text{is\_pp\_winner}_{x,1}]$$

The computing system MPC2 performs a similar process according to the following equation.

$$[\text{counter}_{aggregate\_id(x),2}] = \qquad \text{Equation (14)}$$
$$[\text{counter}_{aggregate\_id(x),2}] + [\text{is\_pp\_winner}_{x,2}]$$

In some implementations, a vector (in the form of secret shares that protect user privacy) is used to increment the counters stored by the MPC cluster 130. For example, a sparse vector in which only the actual value and the phantom value could have a corresponding vector value of 1 and other values have a corresponding vector value of 0 can be used to update the counter variables In some implementations, the MPC cluster 130 tracks the k-anonymity eligibility of any cached selection value associated with a particular aggregate_id using a counter variable. For example, the MPC cluster 130 is able to count the number of times any cached selection value associated with a particular aggregate_id wins a selection process in a given period of time and store this value within a counter variable counter$_{aggregate\_id(x)}$ for a selection value x. The MPC computing systems MPC1 and MPC2 can perform such a computation easily and quickly. However, because the MPC clusters 130 are counting the number of times a digital component wins (or potentially wins) the selection processes, the cluster does not know the number of browsers for which the winning cached selection value represented by x or the associated aggregate_id was selected for distribution, and thus there is a lack of deduplication when incrementing the counter variable. When tracking the k-anonymity eligibility of cached selection values based solely on the MPC cluster 130's count of the selection process winners determined by the MPC cluster 130, a particular digital component associated with a particular aggegrate_id may receive more counts than actually have occurred, e.g. all of the selection process wins could be for the same browser because the digital component is micro-targeting a specific browser. For example, although this method is simple to implement, if there is a final selection process on the client-side at client device 110 using the winners of the MPC cluster 130's selection processes, the winner of the MPC cluster 130's selection processes may not actually be presented for display at the client device 110.

The MPC cluster 130 can update k-anonymity eligibility on a continuous and/or asynchronous basis. Because the comparison operation is fairly costly due to the operation requiring several round trips between the MPC computing systems, the MPC cluster can periodically update k-anonymity eligibility by updating the counter variables to reduce computing resources required and the amount of processing time required. This allows the system to save on communication costs and transmission costs with minimal effects on the distribution and selection of content. For example, by updating the counters for k-anonymity eligibility once every minute instead of every millisecond or upon receiving each impression notification, the MPC cluster 130 can reduce traffic between the computing systems MPC1 and MPC2 and save on transmission costs.

The counter variables control eligibility for selection within the system because k-anonymity eligibility is determined using the counter variables. Therefore, if the counter variables are not updated with sufficient frequency, there is a possibility that digital components corresponding to particular selection values will not be eligible for selection between updates of the counter even though the k threshold has already been satisfied, the system operates with such volume that the impact of updating periodically are minimal.

As described above, the MPC cluster can n update the flag satisfy_k_anonymity$_x$, representing whether the selection value x satisfies k-anonymity, by comparing counter$_{aggregate\_id(x)}$ against k, the threshold for k-anonymity. This step of updating the flag satisfy_k_anonymity$_x$ requires multiple RPCs between MPC1 and MPC2, but because the MPC cluster 130 performs the updating operation asynchronously, it is not latency sensitive and remains unaffected by the processing and communication time required.

FIG. 3 is a flow diagram that illustrates an example process 300 for selecting a digital component for distribution to a client device. Operations of the process 300 can be implemented, for example, by the computing system MPC1 or the computing system MPC2 of the MPC cluster 130. Operations of the process 300 can also be implemented as instructions stored on one or more computer readable media which may be non-transitory, and execution of the instructions by one or more data processing apparatus can cause the one or more data processing apparatus to perform the operations of the process 300. For brevity, the process 300 is described as being performed by the computing system MPC1 of the MPC cluster 130.

Process 300 begins with receiving, by a first server of a secure multi-party computation (MPC) system and from an application on a client device, a request for a selection value (302). For example, computing system MPC1 of the MPC cluster 130 can receive a request for one or more selection values from client device 110 for a particular digital component slot. The request can include information indicating characteristics of the digital component slot, the context (including the content in which the digital component slot is located) of the slot, content distribution and/or selection rules specified by client device 110, and user-provided information, among other information. In some implementations, the selection rules are not encoded in the request and instead are specified by a content publisher directly to the SSP 170 or by a content creator directly to the DSP 150.

In response to receiving the request, process 300 continues with the first server of the secure MPC system conducting, in collaboration with a second server of the secure MPC system, a privacy-preserving selection process to select a first winning selection value from among a set of selection values by applying each rule of a set of selection rules, including a privacy-preserving anonymity enforcement rule (304). For example, computing system MPC1 of the MPC cluster 130 can perform a privacy-preserving selection process as described with respect to FIG. 2 in collaboration with MPC2. The MPC cluster 130 applies all selection rules, including a k-anonymity rule as the privacy-preserving anonymity enforcement rule, to all cached selection values matching UG_Request_Key to determine a set of eligible selection values. The MPC cluster 130 then orders the eligible selection values and selects the winners of the privacy-preserving selection process.

In some implementations, conducting the privacy-preserving selection process to includes, for each selection value, comparing a counter variable value that is mapped to an aggregate identifier that is mapped to the selection value to a threshold, and discarding the selection value if the counter variable value is less than the threshold. The selection value is discarded because the selection value is ineligible for the selection process.

In response to receiving the request, process 300 continues with the first server of the secure MPC system conducting, in collaboration with the second server of the secure MPC system, a counterfactual selection process to select a second winning selection value from among the set of selection values matching UG_Request_Key by applying each rule of the set of selection rules, except for the privacy-preserving anonymity enforcement rule (306). For example, computing system MPC1 of the MPC cluster 130 can perform a counterfactual selection process as described with respect to FIG. 2 in collaboration with MPC2. The MPC cluster 130 applies all selection rules, with the exception of the k-anonymity rule, to the cached selection values to determine a set of eligible selection values. The MPC cluster 130 then orders the eligible selection values and selects the winner of the counterfactual selection process.

As described with respect to FIG. 2, the privacy-preserving selection process and the counterfactual selection process can be conducted in parallel through a batch process such that the winners of the processes are selected and ready for transmission simultaneously.

Process 300 continues with transmitting, by the first server of the secure MPC system, the winning selection value from the privacy-preserving selection process and the winning selection value from the counterfactual selection process (308). For example, MPC1 of the MPC cluster 130 can provide a secret share of the phantom value, or the winning selection value from the counterfactual selection process, and a secret share of the actual value, or the winning selection value from the privacy-preserving selection process, to client device 110.

Transmitting the winning selection values from the privacy-preserving selection process and from the counterfactual selection process can include transmitting, by MPC1 of the MPC cluster 130, a first secret share of a winning selection value to client device 110 and transmitting, by MPC2 of the MPC cluster 130, a second secret share of the winning selection value to client device 110.

Process 300 continues with receiving, by the first server of the secure MPC system and from the application on the client device, data indicating that a digital component corresponding to the winning selection value from the privacy-preserving selection process was presented at the client device (310). For example, MPC1 of the MPC cluster 130 can receive, from client device 110, an update notification that indicates that the digital component for which the actual value was provided was rendered at client device 110.

In some implementations, the notification also includes a variable that indicates whether the first server of the secure MPC system should increment a value of the privacy-preserving data structure. For example, the notification can indicate whether, at the time that the notification was sent, it is the first time within a specified period of time that the winning selection value from the counterfactual selection process was received by the client device as the winning selection value of the counterfactual selection process and a variable that indicates whether, at the time that the notification was sent, it is the first time within a specified period of time that the winning selection value from the privacy-preserving selection process was received by the client device as the winning selection value of the privacy-preserving selection process and that the winning selection value of the privacy-preserving selection process is distinct from the winning selection value from the counterfactual selection process.

In some implementations, the variable indicates whether the MPC cluster 130 should increment the counter to support k-anonymity rules. For example, the application 112 can makes the decision based on whether the application 112 has asked MPC1 to increment the counter for a particular selection value recently. For example, if the phantom value and the actual value are the same, the application 112 will instruct MPC1 to increment the counter for at most one of the two values. In another example, if the browser has asked MPC1 to increment the counter for a digital component previously when it was mapped to the phantom value, the application 112 can refrain from instructing MPC1 to increment the counter in the near future (i.e., within the specific period of time over which k-anonymity is enforced) when the digital component is the actual value.

Additionally, the privacy-preserving data structure further includes a second value for a privacy-preserving characteristic of the digital component corresponding to the winning selection value from the privacy-preserving selection process. For example, the MPC cluster 130 can update counter variables satisfy_k_anonymity$_x$ for each selection value x. The variables satisfy_k_anonymity$_x$ represent whether selection value x satisfies the k-anonymity rule. Additionally, as described above with respect to FIG. 2, the notification can include a variable is_distinct_phantom_value that at the time that the notification was sent, it is the first time within a specified period of time that the phantom value was received by the client device 110 as a phantom value. The notification can also include a variable is_distinct_actual_value.

Process 300 continues with updating, by the secure MPC system, a privacy-preserving data structure for determining whether digital components satisfy the privacy-preserving anonymity enforcement rule that maintains a value for a privacy-preserving characteristic corresponding to the winning selection value from the counterfactual selection process (312). For example, the MPC cluster 130 can update counter variables satisfy_k_anonymity$_x$ for each selection value x. The variables satisfy_k_anonymity$_x$ represent whether selection value x satisfies the k-anonymity rule.

Each counter variable satisfy_k_anonymity$_x$ is mapped to an aggregate identifier, such as aggregate_id. The aggregate identifier is mapped to, for example, a particular digital component for which one or more selection values is provided as candidate selection values to be used in selection processes. Additionally, the secure MPC system can update the privacy-preserving data structure asynchronously and at a specified time interval. For example, the MPC cluster 130 can update the counter variables by comparing the value of a counter variable, represented by variable counter$_{aggregate\_id(x)}$ against a threshold k for k-anonymity, every two minutes to conserve transmission and computation resources required. In some implementations, the secure MPC system can update the privacy-preserving data structure synchronously if performance optimization is not required.

Figure 4:
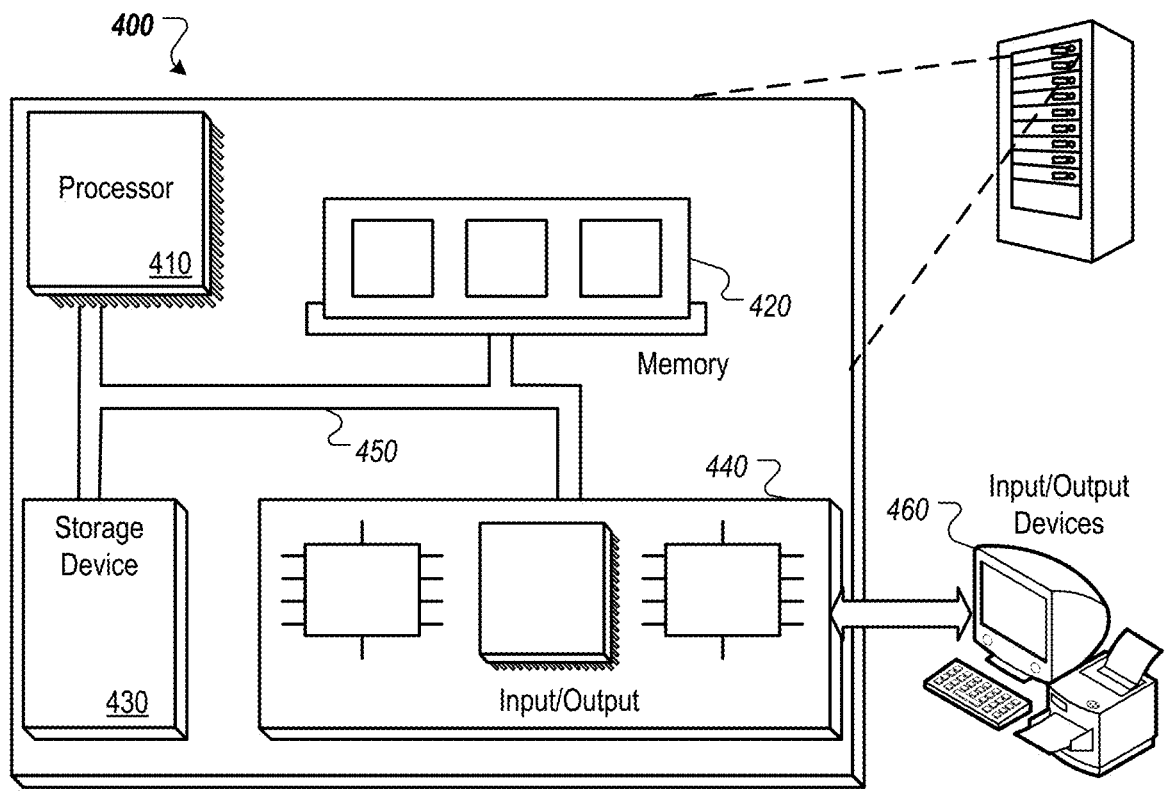
FIG. 4 is a block diagram of an example computer system.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to external devices 460, e.g., keyboard, printer and display devices. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

In addition to the embodiments described above, the following embodiments are also innovative:

Embodiment 1 is a method including receiving, by a first server of a secure multi-party computation (MPC) system and from an application on a client device, a request for a selection value; in response to receiving the request and by the first server of the secure MPC system: conducting, in collaboration with a second server of the secure MPC system, a privacy-preserving selection process to select a first winning selection value from among a set of selection values by applying each rule of a set of selection rules, including a privacy-preserving anonymity enforcement rule; and conducting, in collaboration with the second server of the secure MPC system, a counterfactual selection process to select a second winning selection value from among the set of selection values by applying each rule of the set of selection rules, except for the privacy-preserving anonymity enforcement rule; transmitting, by the first server of the secure MPC system, a selection result defining the first winning selection value from the privacy-preserving selection process and the second winning selection value from the counterfactual selection process; receiving, by the first server of the secure MPC system and from the application on the client device, a notification comprising data indicating that a digital component corresponding to the winning selection value from the privacy-preserving selection process was presented at the client device; and updating, by the first server of the secure MPC system, a privacy-preserving data structure for determining whether digital components satisfy the privacy-preserving anonymity enforcement rule that maintains a first value for a privacy-preserving characteristic corresponding to the second winning selection value from the counterfactual selection process.

Embodiment 2 is the method of embodiment 1, wherein conducting the privacy-preserving selection process and conducting the counterfactual selection process are performed in parallel.

Embodiment 3 is the method of embodiment 1 or 2, wherein the notification further comprises a variable that indicates whether the first server of the secure MPC system should increment a value of the privacy-preserving data structure.

Embodiment 4 is the method of any one of embodiments 1-3, wherein the privacy-preserving anonymity enforcement rule is a k-anonymity rule.

Embodiment 5 is the method of any one of embodiments 1-4, wherein transmitting the winning selection value from the privacy-preserving selection process comprises: transmitting, by the first server of the secure MPC system, a first secret share of the winning selection value from the privacy-preserving selection process to the client device; transmitting, by the second server of the secure MPC system, a second secret share of the winning selection value from the privacy-preserving selection process to the client device; and wherein transmitting the winning selection value from the counterfactual selection process comprises: transmitting, by the first server of the secure MPC system, a first secret share of the winning selection value from the counterfactual selection process to the client device; and transmitting, by the second server of the secure MPC system, a second secret share of the winning selection value from the counterfactual selection process to the client device.

Embodiment 6 is the method of any one of embodiments 1-5, wherein the privacy-preserving data structure comprises a set of counter variables; wherein each counter variable is mapped to an aggregate identifier, wherein each aggregate identifier is mapped to one or more selection values and a particular digital component, and wherein conducting the privacy-preserving selection process to select a first winning selection value from among a set of selection values by applying each rule of a set of selection rules, including a privacy-preserving anonymity enforcement rule comprises: for each selection value: comparing a counter variable value that is mapped to an aggregate identifier that is mapped to the selection value to a threshold; and discarding the selection value if the counter variable value is less than the threshold.

Embodiment 7 is the method of any one of embodiments 1-6, wherein updating the privacy-preserving data structure is performed asynchronously and at a specified time interval.

Embodiment 8 is a system comprising: one or more processors; and one or more memory elements including instructions that, when executed, cause the one or more processors to perform the method of any one of embodiments 1 to 7.

Embodiment 9 is a computer storage medium encoded with instructions that when executed by a distributed computing system cause the distributed computing system to perform the method of any one of embodiments 1 to 7.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method comprising:
receiving, by a first computer and from an application of a client device, a request for a digital component;
in response to receiving the request:
conducting, by the first computer in collaboration with a second computer, a privacy-preserving selection process using a secure multi-party computation (MPC) protocol to select a first digital component from among a set of digital components by evaluating each rule of a set of selection rules for each digital component, including a privacy-preserving anonymity enforcement rule for each digital component; and
conducting, by the first computer in collaboration with the second computer, a counterfactual selection process using the secure MPC protocol to select a second digital component from among the set of digital components by evaluating each rule of the set of selection rules for each digital component, except for the privacy-preserving anonymity enforcement rule for each digital component;
sending, by the first computer and to the client device, a selection result defining the first digital component; and
updating, by the first computer, a privacy-preserving data structure to indicate that the second digital component was selected by the counterfactual selection process.

2. The computer-implemented method of claim 1, wherein conducting the privacy-preserving selection process and conducting the counterfactual selection process are performed in parallel.

3. The method of claim 1, wherein sending the selection result comprises sending, by the first computer and to the client device, a first secret share of data indicating the first digital component.

4. The method of claim 3, wherein the second computer sends, to the client device, a second secret share of the data indicating the first digital component.

5. The method of claim 3, wherein:
the selection result comprises a first share of data indicating the second digital component; and
the second computer sends, to the client device, a second secret share of the data indicating the second digital component.

6. The method of claim 1, wherein updating, by the first computer, a privacy-preserving data structure to indicate that the second digital component was selected by the counterfactual selection process comprises updating a count of a number of times the second digital component has been selected by counterfactual selection processes.

7. The method of claim 6, further comprising updating the privacy-preserving anonymity enforcement rule for the second digital component to indicate that the second digital component is eligible for subsequent privacy-preserving selection processes in response to the count satisfying a threshold.

8. The method of claim 1, wherein updating, by the first computer, a privacy-preserving data structure to indicate that the second digital component was selected by the counterfactual selection process comprises updating a count of a number of users for which the second digital component has been selected by counterfactual selection processes performed to select digital components for the users.

9. The method of claim 8, further comprising updating the privacy-preserving anonymity enforcement rule for the second digital component to indicate that the second digital component is eligible for subsequent privacy-preserving selection processes in response to the count satisfying a threshold.

10. A system comprising:
a first computer comprising one or more processors; and
one or more memory elements including instructions that, when executed, cause the one or more processors to perform operations including:
receiving, by the first computer and from an application of a client device, a request for a digital component;
in response to receiving the request:
conducting, by the first computer in collaboration with a second computer, a privacy-preserving selection process using a secure multi-party computation (MPC) protocol to select a first digital component from among a set of digital components by evaluating each rule of a set of selection rules for each digital component, including a privacy-preserving anonymity enforcement rule for each digital component; and
conducting, by the first computer in collaboration with the second computer, a counterfactual selection process using the secure MPC protocol to select a second digital component from among the set of digital components by evaluating each rule of the set of selection rules for each digital component, except for the privacy-preserving anonymity enforcement rule for each digital component;
sending, by the first computer and to the client device, a selection result defining the first digital component; and
updating, by the first computer, a privacy-preserving data structure to indicate that the second digital component was selected by the counterfactual selection process.

11. The system of claim 10, wherein conducting the privacy-preserving selection process and conducting the counterfactual selection process are performed in parallel.

12. The system of claim 10, wherein sending the selection result comprises sending, by the first computer and to the client device, a first secret share of data indicating the first digital component.

13. The system of claim 12, wherein the second computer sends, to the client device, a second secret share of the data indicating the first digital component.

14. The system of claim 13, wherein:
the selection result comprises a first share of data indicating the second digital component; and
the second computer sends, to the client device, a second secret share of the data indicating the second digital component.

15. The system of claim 10, wherein updating, by the first computer, a privacy-preserving data structure to indicate that the second digital component was selected by the counterfactual selection process comprises updating a count of a number of times the second digital component has been selected by counterfactual selection processes.

16. The system of claim 15, wherein the operations comprise updating the privacy-preserving anonymity enforcement rule for the second digital component to indicate that the second digital component is eligible for subsequent privacy-preserving selection processes in response to the count satisfying a threshold.

17. The system of claim 10, wherein updating, by the first computer, a privacy-preserving data structure to indicate that the second digital component was selected by the counterfactual selection process comprises updating a count of a number of users for which the second digital component has been selected by counterfactual selection processes performed to select digital components for the users.

18. The system of claim 17, wherein the operations comprise updating the privacy-preserving anonymity enforcement rule for the second digital component to indicate that the second digital component is eligible for subsequent privacy-preserving selection processes in response to the count satisfying a threshold.

19. A non-transitory computer storage medium encoded with instructions that when executed by a first computer cause the first computer to perform operations comprising:
receiving, by the first computer and from an application of a client device, a request for a digital component;
in response to receiving the request:
conducting, by the first computer in collaboration with a second computer, a privacy-preserving selection process using a secure multi-party computation (MPC) protocol to select a first digital component from among a set of digital components by evaluating each rule of a set of selection rules for each digital component, including a privacy-preserving anonymity enforcement rule for each digital component; and
conducting, by the first computer in collaboration with the second computer, a counterfactual selection process using the secure MPC protocol to select a second digital component from among the set of digital components by evaluating each rule of the set of selection rules for each digital component, except for the privacy-preserving anonymity enforcement rule for each digital component;
sending, by the first computer and to the client device, a selection result defining the first digital component; and updating, by the first computer, a privacy-preserving data structure to indicate that the second digital component was selected by the counterfactual selection process.

20. The non-transitory computer storage medium claim 19, wherein conducting the privacy-preserving selection process and conducting the counterfactual selection process are performed in parallel.

* * * * *